United States Patent
Marra et al.

(10) Patent No.: US 10,733,254 B2
(45) Date of Patent: Aug. 4, 2020

(54) RANKING OF NEWS FEEDS OF CONTENT INCLUDING CONSIDERATION OF SPECIFIC CONTENT CLICKS BY USERS

(71) Applicant: Facebook, Inc., Menlo Park, CA (US)

(72) Inventors: Gregory Matthew Marra, San Francisco, CA (US); David Vickrey, Mountain View, CA (US); Mahmud Sami Tas, Sunnyvale, CA (US); Yue Zhuo, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 357 days.

(21) Appl. No.: 14/964,815

(22) Filed: Dec. 10, 2015

(65) Prior Publication Data

US 2017/0171139 A1    Jun. 15, 2017

(51) Int. Cl.
*G06F 16/9538* (2019.01)
*G06F 16/2457* (2019.01)
*H04L 29/08* (2006.01)
*G06Q 50/00* (2012.01)
*G06F 16/9535* (2019.01)
*G06F 16/9536* (2019.01)

(52) U.S. Cl.
CPC .... *G06F 16/9538* (2019.01); *G06F 16/24578* (2019.01); *H04L 67/22* (2013.01); *G06F 16/9535* (2019.01); *G06F 16/9536* (2019.01); *G06Q 50/01* (2013.01)

(58) Field of Classification Search
CPC ......... H04L 51/32; H04L 51/14; H04L 67/22; G06Q 50/01; G06F 16/9535; G06F 16/9536; G06F 16/9538; G06F 16/24578

USPC ......................................... 709/204
See application file for complete search history.

(56) References Cited

U.S. PATENT DOCUMENTS

| | | | |
|---|---|---|---|
| 2013/0246521 A1* | 9/2013 | Schacht | H04L 67/1095 709/204 |
| 2014/0129942 A1* | 5/2014 | Rathod | H04N 21/44222 715/720 |
| 2015/0120712 A1* | 4/2015 | Yi | G06F 16/4387 707/723 |

* cited by examiner

*Primary Examiner* — Emmanuel L Moise
*Assistant Examiner* — Xiang Yu
(74) *Attorney, Agent, or Firm* — Fenwick & West LLP

(57) ABSTRACT

An online system, such as a social networking system, monitors user interactions with news feed stories of the social networking system and divides the user interactions into non-content clicks and content clicks. The non-content clicks indicate a user's interest in news feed stories based on user actions such as comments on, likes, shares, and hides the news feed stories. The content clicks indicate a user's interest in news feed stories based on user actions on different specific portions of multimedia content (e.g., videos) in the news feed stories such as playing, fast forwarding. The social networking system trains a model based on the monitored user interactions with news feed stories and uses the trained model to rank news feed stories for presentation to a user. The ranks of news feed stories for a user are determined based on a likelihood that the user would find the story interesting.

16 Claims, 6 Drawing Sheets

RANKING OF NEWS FEEDS OF CONTENT INCLUDING CONSIDERATION OF SPECIFIC CONTENT CLICKS BY USERS

BACKGROUND

This invention relates to news feeds of content presented to users and in particular to ranking news feed stories in online systems, such as social networking systems, including consideration of specific content clicks on the news feed stories.

Certain online systems, such as social networking systems, have a large amount of social information describing actions performed by users on content provided by the systems and in connection with other users of the systems. Social networking systems, for example, present social information as news feed stories to users of the social networking systems, also referred to herein as stories, content items, or feed stories. A news feed story may describe objects represented in a social networking system, for example, a video, a comment from a user, status messages, external links, content generated by the social networking system, applications, games, or user profile. A goal the social networking system in presenting news feeds is to show users of the social networking system the stories that matter most to the users. A social networking system that presents interesting stories relevant to its users is more likely to ensure that users are loyal to the social networking system and regularly interact with the system.

Users of a social networking system may take various actions, e.g., liking, commenting on, or sharing, on news feeds presented by the social networking systems; the social networking system considers the user actions to determine what content to include in news feeds for the users. However, even when users do not like, comment on or share a story in a news feed, this may not mean that the story was not meaningful to the users. For example, a user may have found a video from a nonprofit organization the user follows on the social networking system to be really informative and interesting, but the video is not something the user felt inclined to like, comment on or share more broadly. Furthermore, different interactions by a user with content, such as a video, in a news feed can provide different information about the user's level of interest in that content in particular and in the news feed in general.

SUMMARY

In ranking stories for including in news feeds for users of an online system, such as a social networking system, embodiments of the invention consider a variety of different actions (e.g., likes, comments, shares) that a user can take on a story, and additionally consider more detailed interactions a user can have with actual content within the story. For stories including multimedia content, such as video, audio and a combination of video and audio, the system also considers user more specific interactions with different aspects of the multimedia content (e.g., watching a video in a news feed in a particular way, such as in HD mode, in a full size screen, etc.). Previously, a click on the multimedia content would be recorded, but there was no distinguishing between different types of content clicks on the multimedia content (e.g., play, expand to full size, rewind, among others). However, these different user interactions with different portions of the content within a story may indicate different levels of user interest in the story. For example, rewinding multiple times may indicate a higher level of interest in a video than just simply clicking the play button. Thus, this information can be used in ranking news feed stories for the user in the future, and similar video stories can be ranked higher in the news feed.

In one embodiment, the social networking system divides user interactions with news feed stories into different categories, for example, non-content clicks and content clicks. Examples of non-content click user interactions with news feed stories include general interactions or clicks on the story, such as commenting on a news feed story, liking a news feed story, selecting a link in a news feed story, or hiding a news feed story. Examples of content click user interactions with news feed stories include a click anywhere within a piece of content, such as on multimedia content, in the news feed stories or on an interface associated with the multimedia content (e.g., a user interface (UI), such as physical and/or on-screen buttons, with which the user may interact using a client device to perform functions such as playing the multimedia content). Examples of specific content clicks on stories in a news feed with video content include a click to select, play, fast forward, rewind, mute, expand the display to full screen, show in HD mode, open the settings of the video, and hide.

As noted above, different interactions by a user with multimedia content (e.g., a video) in a news feed, or with different parts of an interface associated with the multimedia content, can provide different information about the user's level of interest in the multimedia content, which can be used in ranking future news feeds for the user. For example, a user clicking to play a video in high definition (HD) mode can show a higher level of interest in the video than a user simply clicking to play the video. In one embodiment, the social networking system assigns different weights to different specific content clicks that can occur regarding multimedia content in news feed stories in determining different levels of user interest in the news feed stories.

The social networking system can also predict an escalating level of a user's interest in a news feed story with multimedia content with each additional content click, and can generate different tiers of user interest in news feed stories. For example, a single content click on a video indicates some level interest, but each additional content click, e.g., a user expanding a display screen of the video to full size, then rewinding, and playing again in HD mode, can be a stronger predictor to indicate a higher tier of user interest in the video.

For purposes of simplicity and the description of one embodiment, the multimedia content will be referred to as a "video," "video files," or "video items," and the story with video content will be referred to as a "video story," but no limitation on the type of multimedia content and news feed are intended by this terminology. Thus, the operations described herein for ranking news feeds in social networking systems considering content clicks on the video in the news feeds can be applied to any type of multimedia content, including videos, audio (e.g. music, podcasts, audio books, and the like), websites, images, multimedia presentations, and others.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system monitors user interactions (e.g., non-content clicks and content clicks) on news feed stories and trains a news feed ranking model based on the monitored user interactions. The social networking system uses the trained news feed ranking model to rank news feed stories for presentation to a user. The rankings of news feed stories for a user are determined based on a likelihood that the user would find the story interesting. For example, in consuming a video story in a news feed, a user turns the volume up or expands the video to full screen, which indicates the user was interested in the video. The social networking system can identify stories having similar videos and rank such video stories higher than other content such that the video stories appear higher up or near the top of the user's news feed.

Various features based on user interaction attributes, user attributes, story attributes, as well social information associated with the users can be used to determine how to rank the news feed stories presented to a user. A machine learning model for ranking news feed stories may be trained using a corpus of training data, e.g., user interactions as well as social information collected by the social networking system. The news feed ranking model may be retrained over time to ensure that the model reflects the latest information available in the social networking system that affects the ranking of news feed stories.

System Environment

Figure 1:
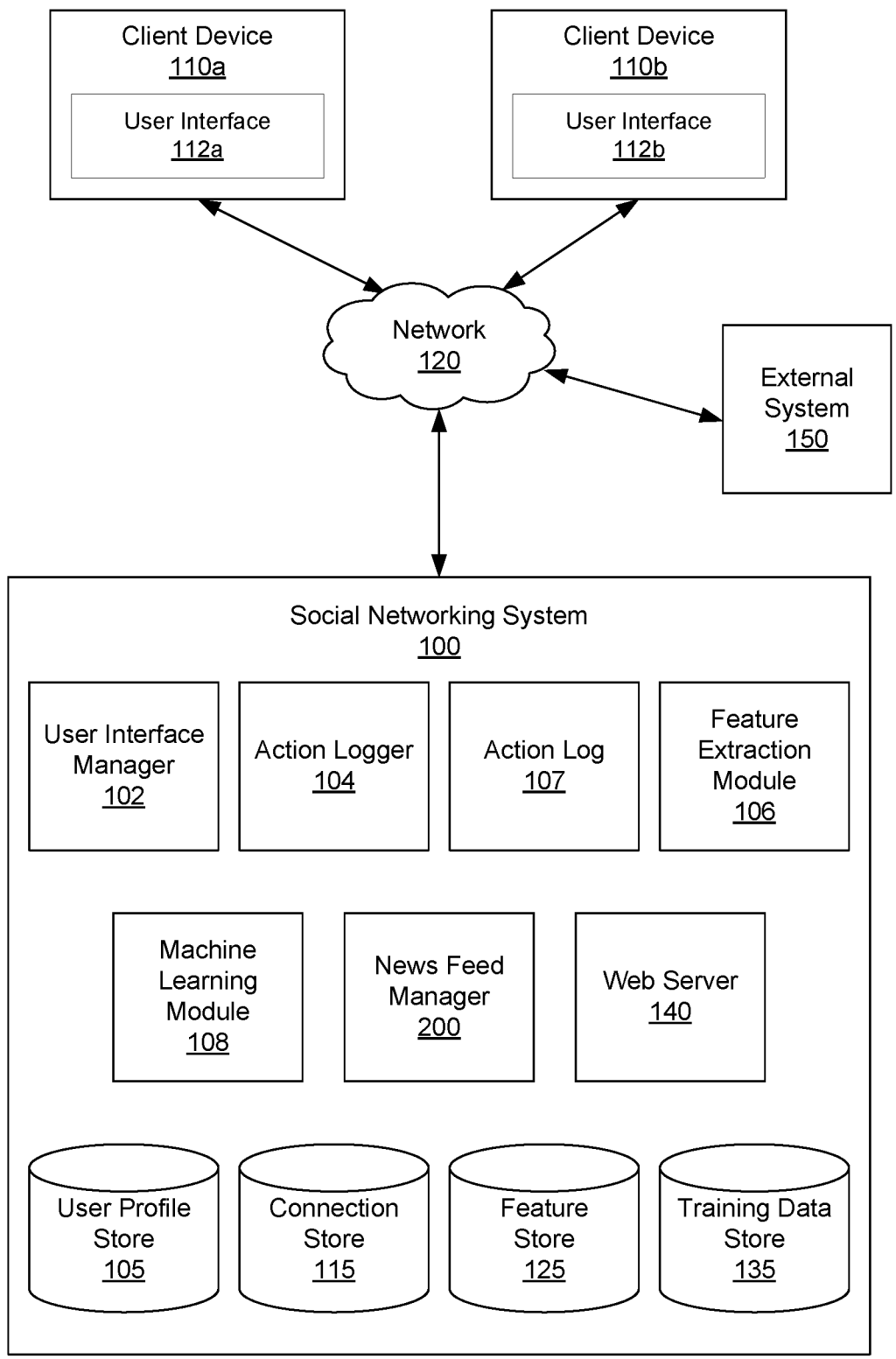
FIG. 1 is a diagram of a system environment for presenting news feed stories to users of a social networking system in accordance with an embodiment.

FIG. 1 is a diagram of a system environment for presenting news feed stories to users of a social networking system in accordance with an embodiment. The users interact with the social networking system 100 using client devices 110; the social networking system 110 connects with an external system 150 and the client devices 110 through a network 120. Some embodiments of the systems 100 may have different and/or other modules than the ones described herein, and the functions can be distributed among the modules in a different manner than described here. A social networking system is one example of an online system that can rank news feeds based on content clicks, and so is used as an example throughout, but this can also apply to other online systems, as well.

Users join the social networking system 100 and add connections to other users of the social networking system 100 as their friends or connections. As used herein, the term "friend" or "connection" refers to any other user to whom a user has formed a connection, association, or relationship via the social networking system 100. The term friend need not require that users to actually be friends in real life; it simply implies a connection in the social networking system 100.

The client device 110 used by a user for interacting with the social networking system 100 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computing functionality, such as a personal digital assistant (PDA), mobile telephone, smartphone, etc.

FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110b" in the figures).

In one embodiment, the client device 110 executes a user interface 112 to allow the user to interact with the social networking system 100. The user interface 112 allows the user to perform various actions associated with the social networking system 100 and to view information provided by the social networking system 100. The actions performed using the user interface 110 include watching videos in a news feed, adding connections, posting messages, uploading images or videos, updating the user's profile, and the like. The information provided by the social networking system 100 that can be viewed using the user interface 112 includes, images or videos posted by the user's connections, comments posted by the user's connections, messages sent to the user by other users, or wall posts. In one embodiment, the user interface 112 is presented to the user via a browser application that allows a user to retrieve and present information from the Internet or from a private network.

The interactions between the client devices 110 and the social networking system 100 are typically performed via a network 120, for example, via the Internet. In one embodiment, the network 120 uses standard communications technologies and/or protocols. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The external system 150 is coupled to the network 120 to communicate with the social networking system 100, and/or with one or more client devices 110. The external system 150 provides content and/or other information to one or more client devices 110, and the social networking system 100. Examples of content and/or other information provided by the external system 150 include multimedia content (e.g., audio, video, etc.) associated with news feed stories, or other suitable information.

Social Networking System

The social networking system 100 ranks news feed stories based on various factors, including user interactions with the news feed stories, and presents to users news feed stories selected based on the ranking. In the embodiment illustrated in FIG. 1, the social network working system 100 includes a user interface manager 102, an action logger 104, a feature extraction module 106, an action log 107, a machine learning module 108, a news feed manager 200, a web server 140, a user profile store 105, a connection store 115, a feature store 125 and a training data store 135. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the social networking system 100.

The web server 140 links the social networking system 100 via the network 120 to one or more client devices 110. The web server 140 serves web pages, as well as other web-related content, such as Flash, XML, and so forth. The web server 140 receives and routes messages between the social networking system 100 and the client devices 110 as well as other external systems, e.g., the external system 150. The messages can be instant messages, queued messages (e.g., email), text and SMS (short message service) messages, or any other suitable messaging technique. In some embodiments, a message sent by a user to another can be viewed by other users of the social networking system 100, for example, by the connections of the user receiving the message. An example of a type of message that can be viewed by other users of the social networking system 100 besides the recipient of the message is a wall post.

The social networking system 100 allows users to communicate or otherwise interact with each other and access content provided by the social networking system 100. The social networking system 100 stores user profile objects in the user profile store 105. The information stored in user profile store 105 describes the users of the social networking system 100, including biographic, demographic, and other types of descriptive information, such as age, work experience, educational history, interests, gender, sexual preferences, hobbies or preferences, location, income, languages spoken, ethnic background, and the like. Information describing a user may be explicitly provided by a user or may be inferred from actions of the user. For example, interests of a user can be inferred from the type of content accessed by the user. The user profile store 105 may store other types of information provided by the user, for example, images, videos, documents, likes indicated by the user, comments, status updates, recommendations of images, videos, or uniform resource locator (URL) links, and the likes.

The connection store 115 stores data describing the connections between different users of the social networking system 100, for example, as represented in a connection object or as an edge between two nodes in a social graph or network of the social networking system 100. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking system 100 based on common characteristics of the users (e.g., users who are alumni of the same educational institution). Connections in social networking system 100 are usually in both directions, but need not be. The connection between users may be a direct connection; however, some embodiments of a social networking system 100 allow the connection to be indirect via one or more levels of connections.

The user interface manager 102 allows users of the social networking system 100 to interact with the social networking system 100. The user interface manager 102 presents social information of interest to a user including news feed stories ranked by the news feed manager 200. In one embodiment, the user interface manager 102 receives the news feed stories and an order in which to present the received news feed stories according to their corresponding rankings from the news feed manager 200, and it provides the news feed stories and the associated order to the user interface 112 of the client device 110 for presentation to the user of the client device 110.

The action logger 104 logs user actions on and/or off the social networking system 100 in an action log 107. In response to a detected user action, the action logger 104 populates the action log 107 with information about the user action, e.g., adding an entry for that action to the action log 107, storing a time stamp along with the log entry. In one embodiment, the action log 107 populated by the action logger 104 includes information describing two classes of user actions: the information indicating the interaction between a user and another user of the social networking system 100, and the information indicating the interaction of a user with a news feed story.

Regarding the class of user actions between any two users of the social networking system 100, an action that a particular user takes with respect to another user is generally associated with each user's profile, which can also be stored by the action logger 104 in an action log. Such actions may include, for example, adding a connection to the other user, sending a message to the other user, reading a message from the other user, viewing content associated with the other user, attending an event posted by another user, among others.

The action logger 104 also logs user interactions with news feed stories. In one embodiment, in response to a user interacting with a news feed story, the action logger 104 logs the interaction in the action log 107 with a log entry, which describes the category of the interaction. The category of a user interaction with a news feed story can be non-content click interactions or content click interactions. Examples of non-content click user interactions with a news feed story include, commenting on the story, liking the story, or following the story such as retrieving further information associated with the story, or clicking on a URL link provided in the story. A non-content click user interaction with a story can also indicate that the user dislikes the story. For example, a user may hide the story indicating a negative feedback towards the story. Alternatively, the user may post a comment on the story with negative sentiments regarding the story.

Content click user interactions with a story include interactions with specific portions of the actual content in the story, such as interactions with a video story or a UI (or UI controls) within the video story. Examples of content click interactions include selecting the video associated with the news feed, and watching the video. However, different interactions by a user with a video in a news feed, or with different parts of an interface associated with the video, can provide finer tuned information about the user's level of interest in the video. For example, a user clicking to play a video in HD mode can show a higher level of interest in the video than a user simply clicking to play the video. In one embodiment, the action logger 104 generates sub-log entries to record different specific content click user interactions with video stories. Examples of specific content clicks on a video story include a click to select, play, fast forward, rewind, mute, expand to full screen, show in HD mode, open configuration settings of the video, and hide. The news feed manager 200 may assign different weights to different specific content clicks that can occur regarding video news feed stories in determining different levels of user interest in the news feed stories.

Figure 3:
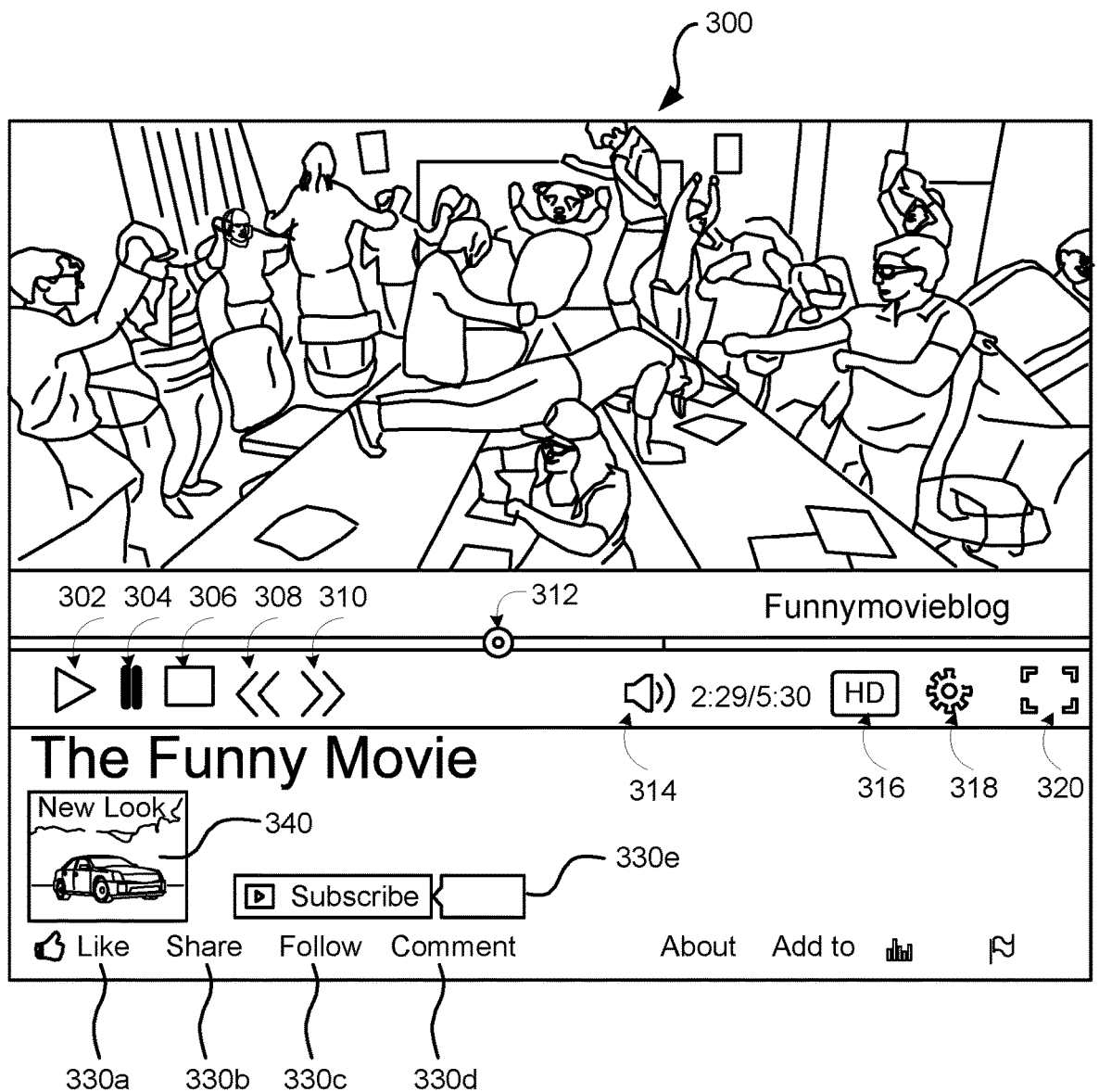
FIG. 3 shows a screenshot of a user interface displaying a news feed story with a video to a user in accordance with one embodiment.

Turning now to FIG. 3, FIG. 3 shows a screenshot of a user interface 300 displaying a video story in a news feed to a user in accordance with one embodiment. The video in the news feed has a title of "The Funny Movie." The user interface 300 includes a variety of interaction tools for a user to interact with the video news story. For the non-content click user interactions, the user interface 300 includes interaction tools, such as like 330a, share 330b, follow 330c, comment 330d, and subscribe 330e, with which the user can like, share, follow, comment on a video story or subscribe to content associated with the story. The action logger 104 logs a non-content click user interaction in response to the using clicking any one of the interaction tools 330.

For the content click user interactions, the user interface 300 includes another set of interaction tools for a user to interact with the video story, such as playing the video 302, pausing the video 304, stopping the video 306, rewinding the video 308, fast forwarding the video 310, dragging a video progress control 312, adjusting the sound of the video 314 (e.g., muting the sound of the video), playing the video in HD mode 316, opening the settings of the video 328, and adjusting the size of the display screen 320 (e.g., expanding to full size). The action logger 104 logs a content click user interaction in response to the using clicking any one of the content click interaction tools.

Returning back to FIG. 1, in ranking news feed stories, the feature extraction module 106 extracts various features that characterize the users, the news feed stories themselves, and user interactions with the news feed stories of the social networking system 100. The feature extraction module 106 stores the extracted features in the feature store 125. The features stored in the feature store 125 can be used by the news feed manager 200 to rank news feed stories for presentation to users and by the machine learning module 108 to train a news feed ranking model. The feature extraction module 106 may run in a batch mode to extract features; alternatively, the feature extraction module 106 may extract the features on a need basis upon invocation by the news feed manager 200. The feature extraction module 106 may store a time stamp along with the features to determine when the features were extracted and whether a feature needs to be regenerated or not. The feature extraction module 106 is further described below with reference to FIG. 4.

In one embodiment, the feature extraction module 106 extracts features of users of the social networking system 100 based on user attributes. A feature of a user can include attributes characterizing the user as well as social information describing the user. The attributes characterizing the user include demographic information of the user including age, income, gender, languages spoken, education, religion, and location. Some of this information may be available in the user profile for the user, though other information can be determined based on user actions on the social networking system 100. Other features of a user include behavioral information describing the user, for example, how often the user checks his news feed, the types of news feed stories with which the user has interacted, or the types of events of social groups in which a user shows an interest. Social information describing a user includes information describing the connections of the user with other users of the social networking system 100.

The feature extraction module 106 also extracts features of news feed stories of the social networking system 100 based on story attributes. A feature of a news feed story can include attributes describing the story, such as historical information associated with the story (age of the story, age of last update on the story), whether the news feed story has multimedia content and/or a URL link, and the time when a user posted a comment, liked the story, or watched the video in the story.

The feature extraction module 106 also extracts features based on user interactions with news feed stories. Examples of features based on user interactions with a news feed story include historical information describing the user interactions, for example, past interactions between users and the story or other similar stories, the rate at which users interact with the story, the categories of interaction between users and the story (e.g., content clicks, non-content clicks or both), the types of users that accessed the story and so on. If a user interacted with a video story in a particular way, such as watching the video in HD mode, expanding the display screen to full size and rewinding the video, the user is more likely to watch other similar video stories regardless of whether the user did not share, comment on, or like the video story. As explained above, content clicks other than a general click on the content anywhere on the content (e.g., a click anywhere on the video) were not previously recorded, so specific content clicks on particular aspects of the content or on control buttons or icons in the content is a new feature that the feature extraction module 106 can include. Multiple different content clicks on various parts of the content can be used as different features in the news feed ranking algorithm.

Figure 2:
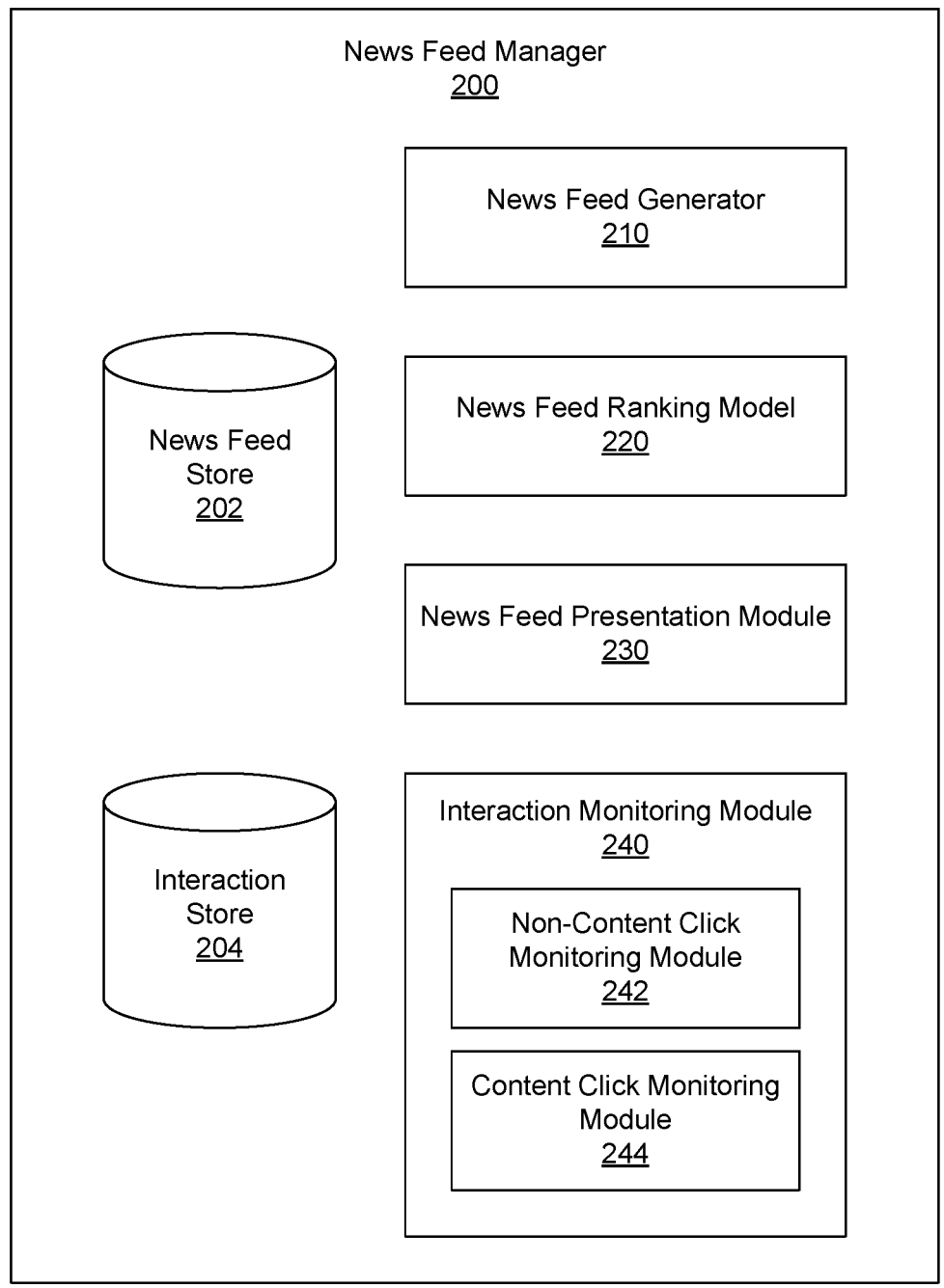
FIG. 2 is a diagram of a news feed manager of a social networking system in accordance with an embodiment.

The machine learning module 108 uses machine learning techniques to train a news feed ranking model for the news feed manager 200, e.g., the news feed ranking model 220 of the news feed manager 200 shown in FIG. 2. In an embodiment, the machine learning module 108 may generate a portion of the functionality invoked by the news feed ranking model 220 of the news feed manager 200. For example, the machine learning module 108 may generate a model that determines a ranking score associated with a given news feed story. The news feed ranking model 220 of the news feed manager 200 can order a set of news feed stories based on the corresponding ranking scores of the news feed stories.

The machine learning module 108 may train the news feed ranking model 220 based on optimization of different types of ranking models, including but not limited to algorithms that analyze every story separately, pairs of stories, or sets of stories. For example, the machine learning module 108 may generate a classifier that takes as input a pair of news feed stories for a given user and returns a score for each of the news feed stories, where the news feed story having a higher score indicates a higher rank than the other news feed story and the higher rank represents a higher probability that the user is interested in the news feed story having the higher rank. The news feed ranking model 220 of the news feed manager 200 can use the output of the generated classifier to rank a given set of news feed stories by doing pair wise comparisons of the ranking scores of the stories. Other embodiments can use other machine learning techniques for ranking news feed stories, for example, tree-based models, kernel methods, neural networks, splines, or a combination of one or more of these techniques.

The machine learning module 108 uses training data sets for training the news feed ranking model 220 of the news feed manager 200. The training data store 135 stores training data sets comprising tuples of users of the social networking system, news feed stories, and user interactions with the news feed stories. The users, stories, and user interactions can be identified in a tuple stored in the training data store 135 using identifiers that uniquely identify the users, the stories, and the user interactions, respectively. The user interaction between a user and a news feed story can indicate whether the user interacted with the story or not and category of the user interaction: content click or non-content click. For content click user interactions, the information describing the user interactions may include additional information describing the particular content clicks on the videos of video stories, e.g., opening settings of the videos.

In one embodiment, the machine learning module 108 periodically retrains the news ranking model 220 of the news feed manager 200. For example, the machine learning module 108 receives updates from the action logger 104 in response to new user interactions detected by the news feed manager 200, such as content click user interactions with video news feed stories presented to users of the social networking system 100. The machine learning module 108 may retrain the news ranking model 220 at a fixed frequency. In one embodiment, the machine learning module 108 may train different news ranking models corresponding to different subsets of users and train different news ranking models at different rates based on user information describing how users of the subsets interact with the news feed stories ranked by the different news ranking models. Examples of embodiments of training and retraining different ranking models for different subsets of users include some described in U.S. Pat. No. 8,768,863, which is incorporated by reference herein in its entirety.

Figure 4:
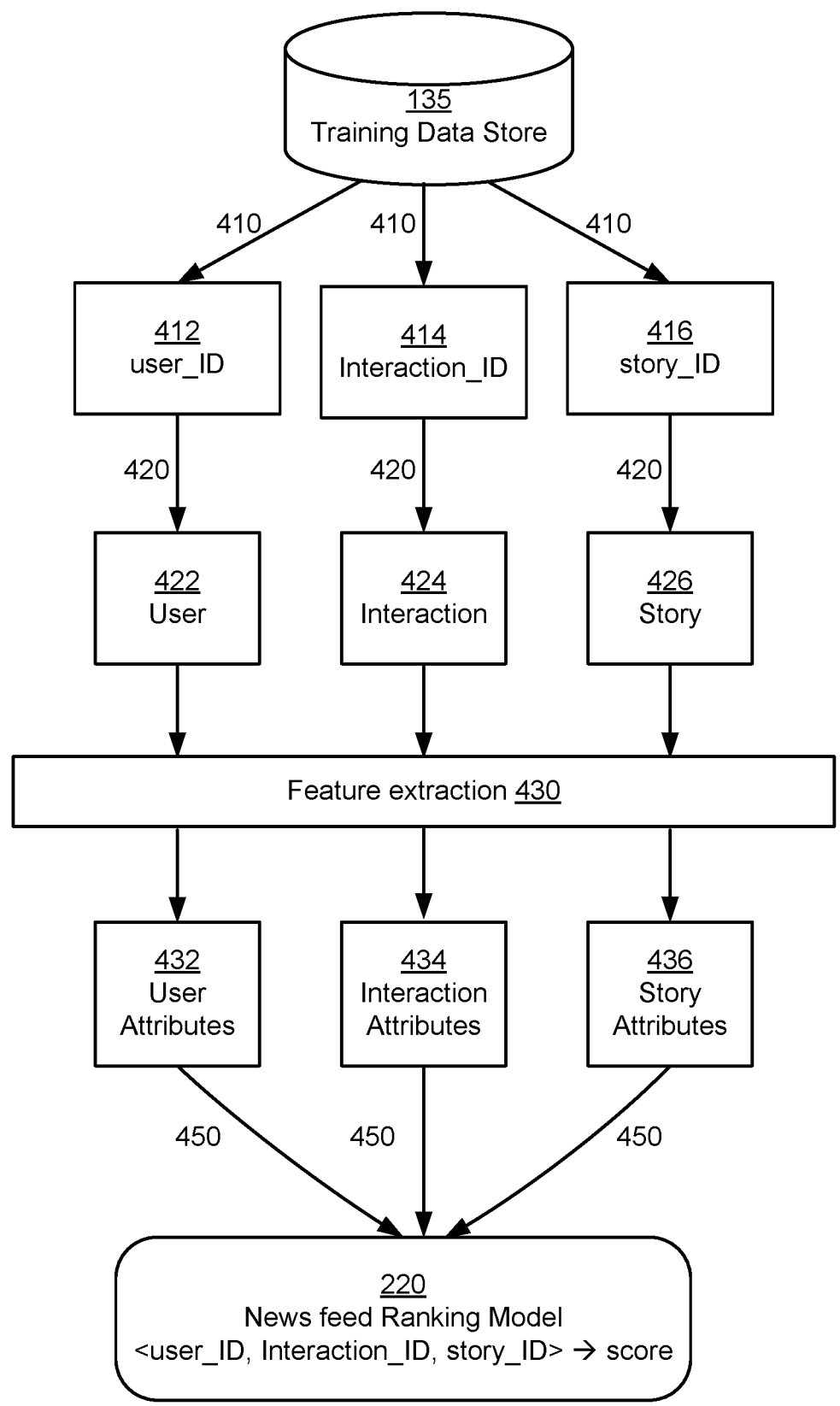
FIG. 4 shows a data flow diagram illustrating the training of a news feed ranking model based on various types of data stored in a social networking system in accordance with one embodiment.

FIG. 4 shows a data flow diagram illustrating the training of a news feed ranking model 220 based on various types of data stored in a social networking system 100 in accordance with one embodiment. The machine learning module 108 trains the news feed ranking model 220 based on training data stored in the training data store 135. The information used for training the news feed model 220 comprises information describing the users of news feed stories, information describing stories and information describing the user interactions with the news feed stories. The machine learning module 108 retrieves 410 information identifying a user (referred to as user_ID 412), information identifying a news feed story (referred to as story_ID 416), and information identifying user interaction (referred to as interaction_ID 414) between the user identified by user_ID 412 and the story identified by story_ID 416 from the training data store 135. The information identifying the interaction between the user and the story may indicate whether the user interaction with the story is a non-content click user interaction or a content-click user interaction.

The machine learning module 108 retrieves 420 social networking objects describing entities associated with the user_ID 412, the interaction_ID 414 and story_ID 416. For example, the machine learning module 108 may retrieve 420 an object representing a user 422 identified by the user_ID 412, an object representing a user interaction 424 identified by the interaction_ID 414, and an object representing a story 426 identified by the story_ID 416. The machine learning module 108 may retrieve other objects representing entities, not shown in FIG. 4, in the social networking system 100 that are associated with the user 422, the user interaction 424 and the story 426. For example, the machine learning module 345 may retrieve connections 430 of the user and other objects representing entities, for example, objects representing a video, event, or a social group associated with the story 426.

The machine learning module 108 invokes the feature extraction module 106 to extract 430 features from the objects representing various entities associated with the user 422, the user interaction 424 and the story 426. The machine learning module 108 may retrieve the features from the feature store 125 if the features have been previously extracted by the feature extraction module 106 and stored in the feature store 125. As shown in FIG. 4, the features extracted include features based on user attributes 432, features based on user interactions with stories 434, and feature based on story attributes 436. The machine learning module 108 trains 450 the news feed ranking model 220 based on the extracted features. The trained news feed ranking model 220 generates a ranking score for a user identified by user_ID 412 when presented with a story identified by story_ID 416. The news feed ranking model 220 generates the ranking score based on weights and probabilities assigned to attributes of the user identified by user_ID 412, the attributes of the user interaction identified by interaction_ID 414, and attributes of the story identified by story_ID 416.

Managing News Feed Stories

The news feed manager 200 manages activities related to news feed stories including, generating the news feed stories, selecting the news feed stories for presentation to users of the social networking system 100, ranking the news feed stories identified for presentation to a user, and presenting the news feed stories via the user interface manager 102. FIG. 2 is a diagram of a news feed manager 200 of the social networking system 100 in accordance with an embodiment. The news feed manager 200 includes a news feed generator 210, a news feed ranking model 220, a news feed presentation module 230, an interaction monitoring module 240, a news feed store 202 and an interaction store 204. Other embodiments of the news feed manager 200 many have different and/or other modules than the ones described herein, and the functions can be distributed among the modules in a different manner than described here.

The news feed generator 210 retrieves or generates news feed stories for presentation to users of the social networking system 100. In an embodiment, the news feed generator 210 analyzes information stored in the action log to identify information useful for generating news feed stories. The news feed generator 210 identifies actions stored in action log that are likely to be of interest to users and accesses information describing these actions from the action log to generate news feed stories. Alternatively, the news feed generator 210 can obtain information describing actions from other modules, for example, from the user interface manager 102, or other run time modules that perform different types of actions. For example, if a user uploads a video to the social networking system 100, the module executing the code for uploading the video can inform the news feed generator 210 of the action so that the news feed generator 210 can generate a news feed story describing the action.

The news feed generator 210 may determine that certain actions are not likely to be of interest to users for reporting as news feed stories. For example, a user hiding a comment posted by another user or a user changing certain types of user preferences may not be of interest to other users and is therefore not reported in news feed stories. The news feed generator 210 may not generate news feed stories based on certain actions as a matter of policies enforced by the social networking system 100. For example, a user viewing user profile of another user or a user sending a private message to another user may not be presented as news feed stories due to privacy concerns. A user may restrict the types of actions that are reported as news feed stories. For example, the user may specify that certain actions, for example, adding a new connection may not be reported as news feed stories.

In one embodiment, the news feed generator 210 stores the news feed stories generated in the news feed store 202. The news feed store 202 may be represented as a database that links various objects related to the news feed stories. Each news feed story stored in the news feed store 202 can be associated with other entities in the social networking system 100. For example, a news feed story 180 may be associated with one or more users that performed an action described in the news feed story in the social networking system 100. In other embodiments, the news feed stories are not generated in advance and stored, but are generated at the time that a user is available to view a new news feed.

The news feed ranking model 220 ranks news feed stories being presented to a user of the social networking system 100. In one embodiment, the news feed ranking model 220 generates a ranking score for a story to be presented to a user. The news feed ranking model 220 generates the ranking score based on attributes of the user, attributes of the story, the attributes of the user interactions with the story, or a combination of the attributes of the user, the story and the user interactions. The news feed ranking model 220 provides the ranking score for each story in a select set of stories to the news feed presentation module 230 for presentation of the news feed to the user.

In one embodiment, the news feed ranking module 210 determines a ranking score for a news feed story for a given user based on the features extracted from attributes of the news feed story, features extracted from the attributes of the user and features extracted from the attributes of the user interactions with the news feed story. The ranking score associated with a news feed story can be determined as an aggregate value based on individual scores associated with the extracted features. An example of an aggregate value is a weighted average of a set of values. For example, the news feed ranking module 210 multiplies a weight assigned to a features of a user interaction on a news feed story by a predefined probability associated with the feature of the user interaction to generate an individual score for the user interaction. The news feed ranking module 210 may assign different weights to different features of user interactions, e.g., watching a video news feed story in HD mode having a larger weight than watching the video in its default setting. Different weights and probabilities associated with different features of user interactions indicate different levels of user interest in the news feed stories. The news feed ranking modules 210 learns the different weights and probabilities associated with user interactions from the training by the machine learning module 108.

In one embodiment, the news feed ranking model 220 is trained by the machine learning module 108 using the training data stored in the training data store 135, where the trained news feed ranking model 220 is configured to apply suitable weights and probabilities for ranking a news feed story for presentation to a given user. In one embodiment, the news feed ranking model 220 analyzes various interactions of the users with the news feed stories to determine weights assigned to the various user interactions. The news feed ranking model 220 may divide news feed stories into different subsets based on their characteristics, e.g., video news feed stories and non-video news feed stories. For ranking video news feed stories, the news feed ranking model 200 not only considers the non-content click user interactions, e.g., comment on, share, like, etc., but also considers content click user interactions, e.g., the particular ways with which users interact with videos of the news feed stories, and assigns different weights to non-content click user interactions and content click interactions.

The particular ways with which a user interacts with a video of a news feed story can provide different information about the user's level of interest in the video. For example, a user clicking to play the video in HD mode can show a higher level of interest in the video than the user simply clicking to play the video. In one embodiment, the news feed ranking model 220 assigns different weights to different specific content clicks that can occur regarding videos of news feed stories in ranking the news feed stories.

The news feed ranking model 220 can also predict an escalating level of a user's interest in a video news feed story with each additional content click and generates different tiers of user interest in the video news feed story. For example, a single content click on a video indicates some level interest, but each additional content click, e.g., a user expanding a display screen of the video to full size, then rewinding, and playing again in HD mode, can be a stronger predictor to indicate a higher tier of user interest in the video. In one embodiment, the news feed ranking model 220 generates a ranking score for a video news story for each tier of user interest in response to each additional content click and provides the ranking scores and associated tiers to the news feed presentation module 230 for further processing.

The news feed ranking model 220 described above is based on user interactions with news feed stories. In another embodiment, the machine learning module 108 can train another news feed ranking model, which is substantially based on the interactions among the users of the social networking system 100. An example embodiment of the news feed ranking model based on interactions among the users is described in U.S. Pat. No. 8,768,863, which is incorporated by reference herein in its entirety. If the amount of past interaction of a given user with other users of the social networking system 100 is determined to be below a threshold value, the news feed ranking model 220 based on user interactions with news feed stories is selected to rank news feed stories. In another embodiment, the news feed ranking model 220 based on user interactions with news feed stories is automatically selected in response to video news feed stories.

The news feed presentation module 230 determines the news feed stories to be presented to a user and provides the stories selected for presentation to the user interface manager 102. The user interface manager 102 presents the selected news feed stories to the user interface 112 on a client device 110. The news feed presentation module 230 determines a set of stories for presentation to a user based on various factors including, user's request for news feed stories, the user's past interactions with news feed stories, types of news feed stories the user has accessed, frequency of accessing news feed stories by the user, the user's profile, social information describing the connections between the user and other users of the social networking system 100, and the like. In some embodiments, the user interface is provided by a system other than the social networking system 100.

The news feed presentation module 230 invokes the news feed ranking model 220 to rank the determined set of news feed stories to be presented to the user. The news feed presentation module 230 may present a subset of the stories based on the ranking, for example, the top 10 stories, depending on the display area available on the user interface 112 for presenting the stories. The news feed presentation module 230 presents the stories in the order determined by the ranking, for example, stories ranked higher may be presented more prominently compared to stories ranked lower. In an embodiment, the stories ranked higher are presented above the stories ranked lower. In other embodiments, stories ranked higher may be presented more prominently by displaying them using an appropriate text color, font, text size, back ground color, etc.

The interaction monitoring module 240 monitors user interactions with news feed stories presented by the social networking system 100. In the embodiment shown in FIG. 2, the interaction monitoring module 240 includes a non-content click monitoring module 242 and a content click monitoring module 244. The non-content click monitoring module 242 monitors non-content click user interactions with news feed stories including, user commenting on a news feed story, liking a news feed story, selecting a link in a news feed story, or hiding a news feed story. The content click monitoring module 244 monitors content click user interactions with news feed stories including, clicking anywhere on videos in the news feed stories and on interfaces associated with the videos. The content click monitoring module 244 further monitors specific content click user interactions with news feed stories including, clicking to select the videos, playing, fast forwarding, rewinding, muting the sound of the videos, expanding to full screen, showing in HD mode, opening the settings of the videos, and hiding the videos. The interaction monitoring module 240 provides the monitored user interactions with news feed stories to the machine learning module 108, which trains and/or retrains the news feed model 220 of the news feed manager 200.

Figure 5:
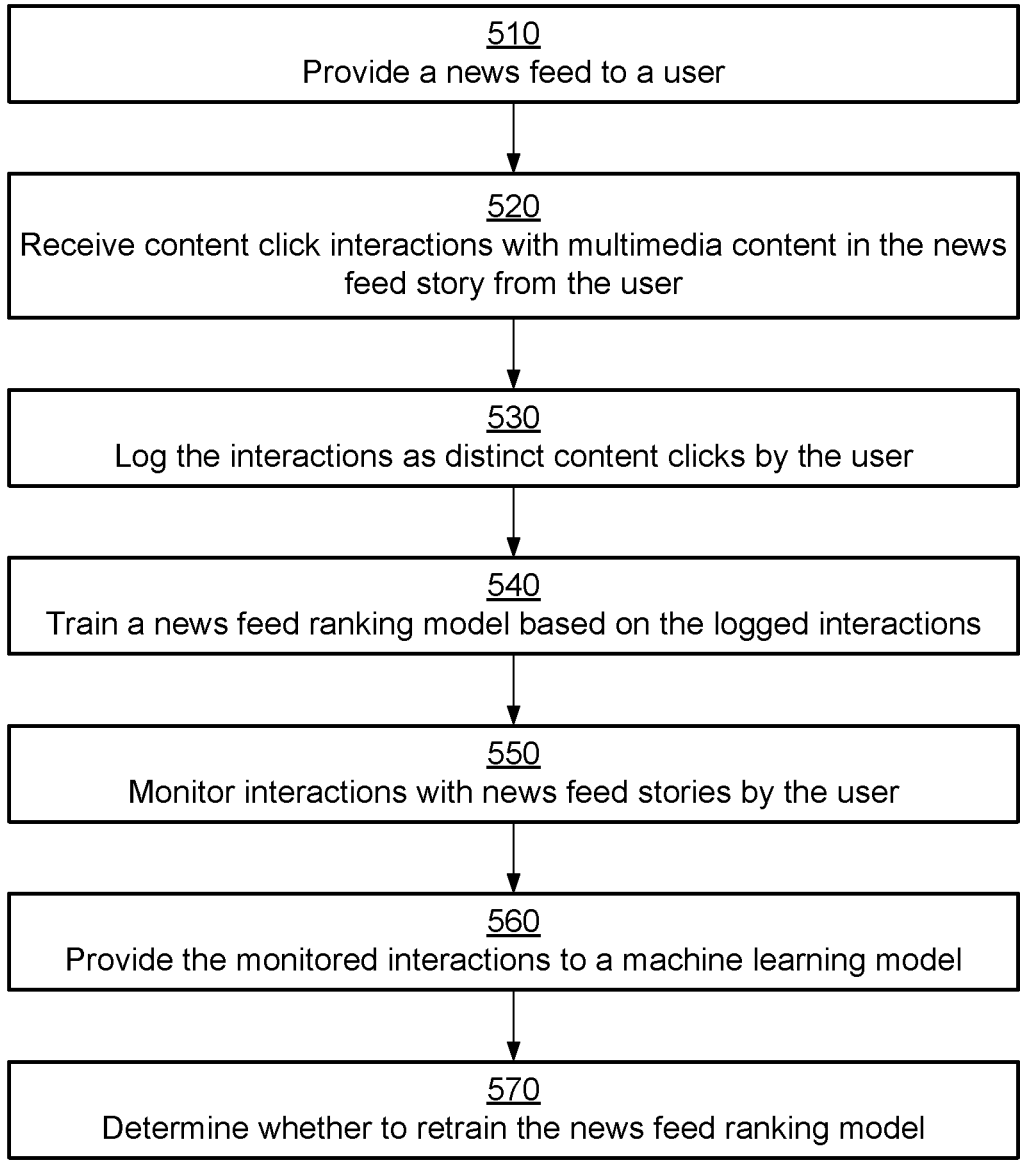
FIG. 5 is a flow chart of training a news feed ranking model based on logged user interactions with multimedia content in new fees stories in accordance with one embodiment.
Figure 6:
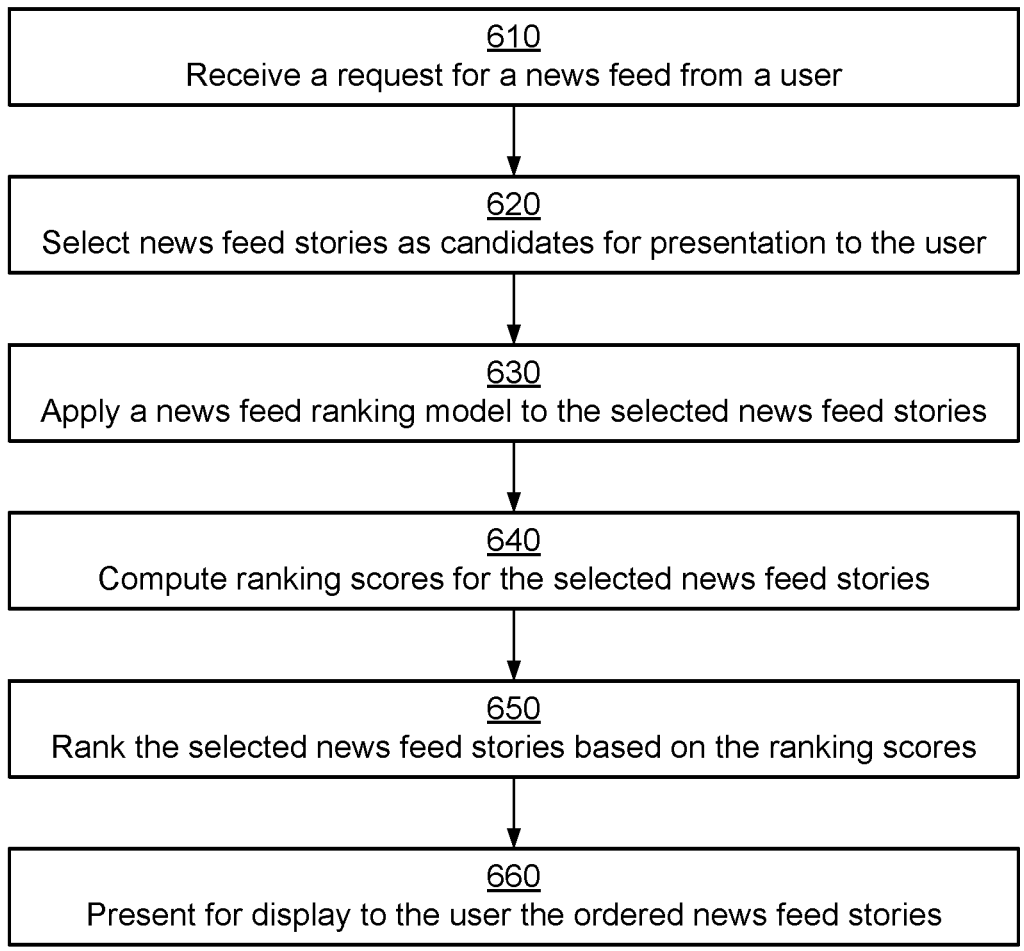
FIG. 6 is a flow chart of presenting news feed stories selected by a trained news feed ranking model in response to a user request for a news feed in accordance with one embodiment.

FIG. 5 is a flow chart of training a news feed ranking model based on logged user interactions with multimedia content in new fees stories in accordance with one embodiment. Initially, the news feed manager 200 provides 510 a news feed to a user, and receives 520 content click interactions with multimedia content (e.g., videos) in the news feed story from the user. The news feed manager 200 logs the content click interactions in an action log as distinct content clicks by the user. The news feed manager 200 trains 540 a news feed ranking model based on the logged interactions. The news feed manager 200 monitors 550 interactions with news feed stories by the user, and provides 560 the monitored interactions to a machine learning model, e.g., the machine learning model 108. Some of these interactions can include content clicks on multimedia content in news feed stories. Based on the monitored interactions over time, the news feed manager 200 determines 570 whether to retrain the news feed ranking model. The news feed manager 200 may repeat all or some of the steps described above for another user or another set of news feed stories FIG. 6 is a flow chart of presenting news feed stories selected by a trained news feed ranking model in response to a user request for a news feed in accordance with one embodiment. Initially, the news feed manager 200 receives 610 a request for news feed stories from a user, and selects 620 a set of news feed stories based on the user's past interactions with news feed stories. In one embodiment, the news feed model 200 selects the stories for the user using the trained news feed ranking model such that the stories selected are affected by the fact that the user previously had some content clicks on a video in a new feed story presented to the user. The news feed manager 200 applies 630 a news feed ranking model, e.g., the news feed ranking model 220 shown in FIG. 2, to the selected news feed stories. The news feed ranking model 220 of the news feed manager 200 computes 640 a ranking score for each news feed story in the selected set of news feed stories. The news feed manager 200 ranks 650 the news feed stories based on the ranking scores associated with the news feed stories such that the multimedia content of the same type as the one with which the user interacted previously using various content click control tools, e.g., play, rewind, etc., will appear higher in the ranking. The news feed manager presents 660 for display the ordered news feed stories based on the ranking to the user.

Considering a variety of different actions (e.g., likes, comments, shares, watching a video in a specific way) that a user can take on a news feed story in ranking stories for including in news feeds for users of a social networking system enables the social networking system advantageously to provide finer tuned information about the user's level of interest in the news feed stories. Dividing user interactions with news feed stories into different categories, for example, non-content clicks and content clicks captures user's interactions with news feed stories, especially news feed stories with multimedia content, e.g., videos, audios, images, etc., helps the social networking system 100 to identify news feed stories that matter most to users of the social networking system.

Conclusory Statements

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method comprising:
providing, for display to a user, a plurality of news feed stories in a first news feed of a social networking system, including a video story having a plurality of user interface controls that affect an interface of the video story;
receiving interactions by the user with two or more of the user interface controls within the video story;
logging each of the interactions by the user with the two or more user interface controls within the video story as distinct content clicks by the user indicating interest of the user in the video story and logging other types of interactions with the news feed stories as non-content clicks;
training, based on training data, a model configured to rank a different set of news feed stories of the social networking system for presentation to the user in a second news feed based on aggregated scores for the news feed stories, the training data for the user comprising the logged content clicks of the user interactions with the two or more user interface controls within the video story, the logged non-content clicks, and features associated with interactions by the user with news feed stories, wherein the training comprises:
assigning a weight and a probability to each feature associated with an interaction by the user with a news feed story, wherein some of the features are content clicks that are interactions with two or more user interface controls within a video story, the assigning comprising:
determining whether an interaction by the user with a news feed story is a content click interaction;
assigning a weight and a probability to the interaction by the user on a video in the news feed story;
generating a score for the interaction by the user on the video in the news feed story; and
for each subsequent user interaction on the video in the news feed story, generating a higher score for the user interaction than the score for the previous user interaction on the video in the news feed story;
generating a score for each feature associated with the interaction based on the weight and probability associated with the feature; and
aggregating scores for the features associated with the interaction to generate an aggregated score for the user interaction;
receiving a request by the user for a second news feed in the social networking system;
ranking the different set of news feed stories, including video stories, identified as candidates for presentation to the user of the social networking system using the model trained based on the logged content and non-content clicks, the ranking occurring based on the aggregated scores generated by the model such that video stories in the set that are similar to the video story are ranked higher among the news feed stories based on the content clicks than video stories in the set that are not similar to the video story; and
providing for display to the user a plurality of news feed stories of the different set in an order in the second news feed according to the ranking determined using the model trained based on the logged content and non-content clicks.

2. The method of claim 1, wherein a distinct content click by the user within a video story captures an action of the user on a specific user interface control of the video story.

3. The method of claim 2, wherein the video story comprises a video.

4. The method of claim 2, wherein a distinct content click by the user within the video story indicates a level of interest of the user in the video story.

5. The method of claim 2, wherein the distinct content click by the user comprises at least one of:
playing the video;
fast forwarding the video;
rewinding the video;
muting sound of the video;
turning on sound of the video;
expanding a display showing the video to full screen;
showing the video in high definition mode;
opening configuration settings of the video; and
hiding display of the video.

6. The method of claim 1, further comprising receiving a plurality of non-content clicks by the user in response to the user interacting with the video story, wherein a non-content click by the user with the video story comprises at least one of:
commenting on the video story;
liking the video story;
selecting a link in the video story; and
hiding the video story.

7. The method of claim 1, wherein the training data further comprises features associated with attributes of the users and features associated with attributes of the news feed stories.

8. The method of claim 1, further comprising:
monitoring interactions by the user with the news feed stories presented to the user; and determining whether to retrain the model based on the monitoring.

9. A non-transitory computer-readable storage medium storing executable computer program instructions, the computer program instructions comprising code for:
providing, for display to a user, a plurality of news feed stories in a first news feed of a social networking system, including a video story having a plurality of user interface controls that affect an interface of the video story;
receiving interactions by the user with two or more of the user interface controls within the video story;
logging each of the interactions by the user with the two or more user interface controls within the video story as distinct content clicks by the user indicating interest of the user in the video story and logging other types of interactions with the news feed stories as non-content clicks;
training, based on training data, a model configured to rank a different set of news feed stories of the social networking system for presentation to the user in a second news feed based on aggregated scores for the news feed stories, the training data for the user comprising the logged content clicks of the user interactions with the two or more user interface controls within the video story, the logged non-content clicks, and features associated with interactions by the user with news feed stories, wherein the training comprises:
assigning a weight and a probability to each feature associated with an interaction by the user with a news feed story, wherein some of the features are content clicks that are interactions with two or more user interface controls within a video story, the assigning comprising:
determining whether an interaction by the user with a news feed story is a content click interaction;
assigning a weight and a probability to the interaction by the user on a video in the news feed story;
generating a score for the interaction by the user on the video in the news feed story; and
for each subsequent user interaction on the video in the news feed story, generating a higher score for the user interaction than the score for the previous user interaction on the video in the news feed story;
generating a score for each feature associated with the interaction based on the weight and probability associated with the feature; and
aggregating scores for the features associated with the interaction to generate an aggregated score for the user interaction;
receiving a request by the user for a second news feed in the social networking system;
ranking the different set of news feed stories, including video stories, identified as candidates for presentation to the user of the social networking system using the model trained based on the logged content and non-content clicks, the ranking occurring based on the aggregated scores generated by the model such that video stories in the set that are similar to the video story are ranked higher among the news feed stories based on the content clicks than video stories in the set that are not similar to the video story; and
providing for display to the user a plurality of news feed stories of the different set in an order in the second news feed according to the ranking determined using the model trained based on the logged content and non-content clicks.

10. The computer-readable storage medium of claim 9, wherein a distinct content click by the user within a video story captures an action of the user on a specific user interface control of the video story.

11. The computer-readable storage medium of claim 10, wherein the video story comprises a video.

12. The computer-readable storage medium of claim 10, wherein a distinct content click by the user within the video story indicates a level of interest of the user in the video story.

13. The computer-readable storage medium of claim 10, wherein the distinct content click by the user comprises at least one of:
playing the video;
fast forwarding the video;
rewinding the video;
muting sound of the video;
turning on sound of the video;
expanding a display showing the video to full screen;
showing the video in high definition mode;
opening configuration settings of the video; and
hiding display of the video.

14. The computer-readable storage medium of claim 9, further comprising computer program instructions for receiving a plurality of non-content clicks by the user in response to the user interacting with the video story, wherein a non-content click by the user with the video story comprises at least one of:
commenting on the video story;
liking the video story;
selecting a link in the video story; and
hiding the video story.

15. The computer-readable storage medium of claim 9, wherein the training data further comprises features associated with attributes of the users and features associated with attributes of the news feed stories.

16. The computer-readable storage medium of claim 9, further comprising computer program instructions for:
monitoring interactions by the user with the news feed stories presented to the user; and
determining whether to retrain the model based on the monitoring.

* * * * *